(No Model.) 2 Sheets—Sheet 1.
O. GATES.
BALING PRESS.
No. 535,754. Patented Mar. 12, 1895.
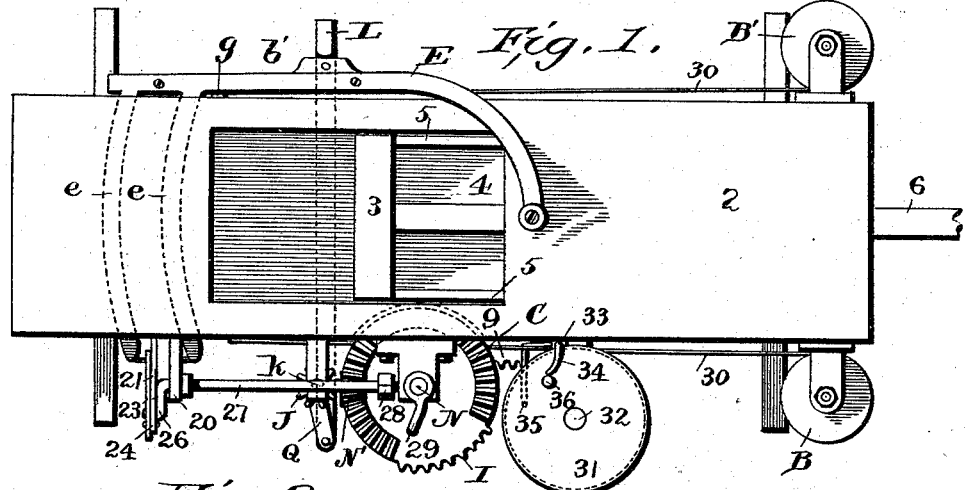
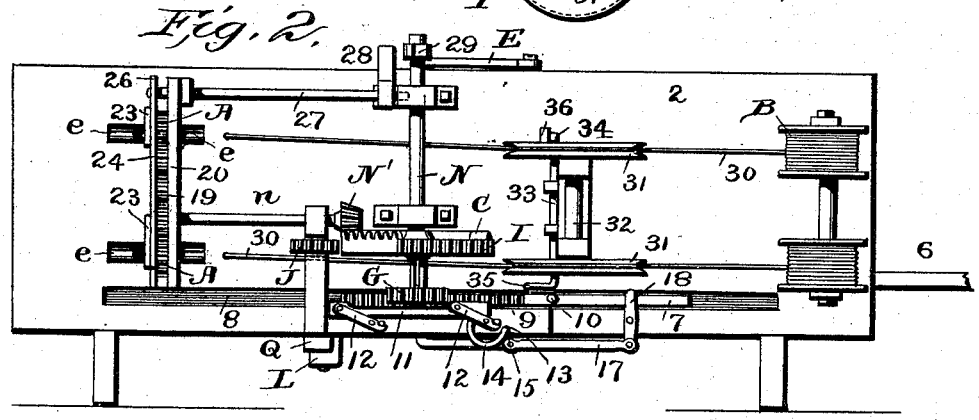
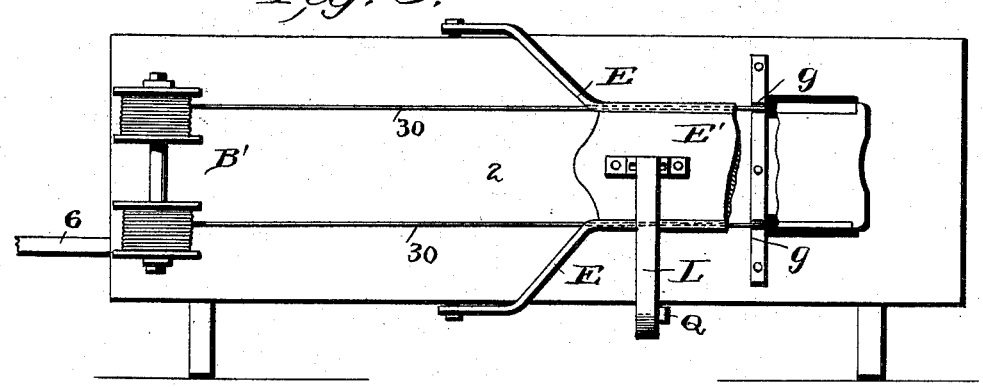
Witnesses
Albert Sheridan
Van Buren Hillyard.
Inventor
Otus Gates.
By Attorneys R. S. & A. H. Lacey (No Model.) 2 Sheets—Sheet 2.
O. GATES.
BALING PRESS.
No. 535,754. Patented Mar. 12, 1895.
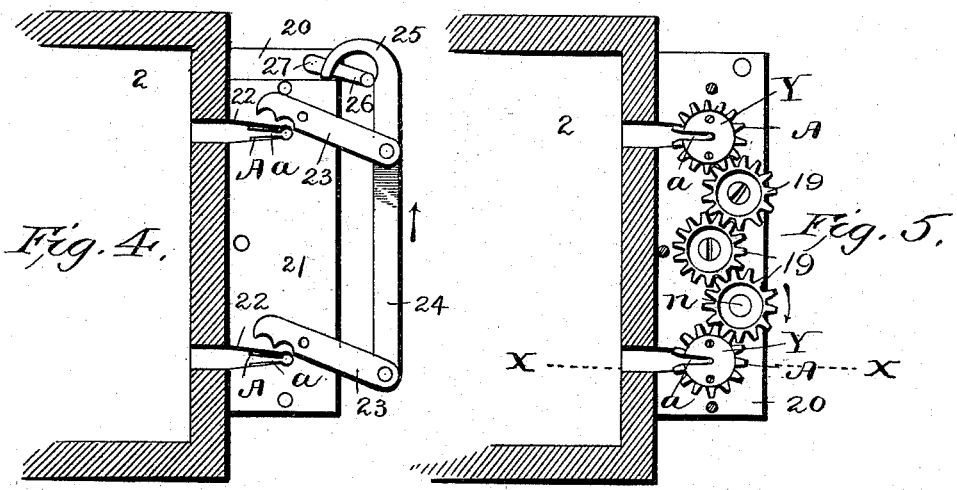
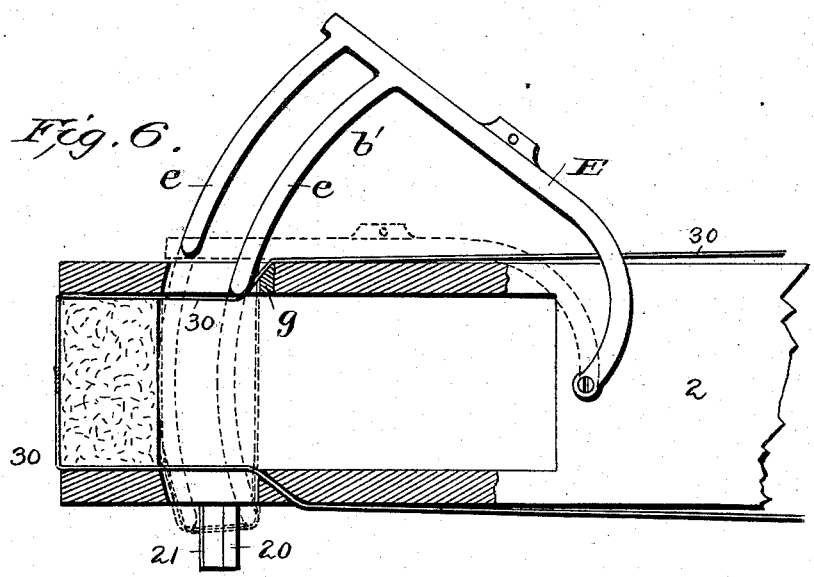
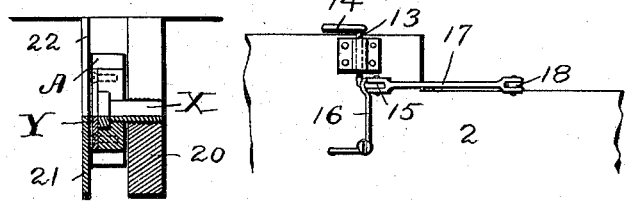
Witnesses
Albert Speiden
Van Buren Hillyard
Inventor
Olus Gates.
By Attorneys R. S. & A. P. Lacey
THE NORRIS PETERS CO., PHOTO-LITHO., WASHINGTON, D. C.

UNITED STATES PATENT OFFICE.

OLUS GATES, OF ESTHERVILLE, IOWA.

BALING-PRESS.

SPECIFICATION forming part of Letters Patent No. 535,754, dated March 12, 1895.

Application filed June 28, 1893. Serial No. 479,066. (No model.)

*To all whom it may concern:*

Be it known that I, OLUS GATES, a citizen of the United States, residing at Estherville, in the county of Emmet, State of Iowa, have invented certain new and useful Improvements in Baling-Presses; and I do hereby declare the following to be a full, clear, and exact description of the invention, such as will enable others skilled in the art to which it appertains to make and use the same.

The present invention relates to baling presses; and aims to dispense with followers for separating the bale and provide the press with devices for continuously supplying wires for binding the bale, twisting the ends of the wires together after being looped around the bale and brought together, and with cutting mechanism for severing the wires after the ends have been twisted together.

The improvement consists of the novel features and the peculiar construction and combination of the parts which will be hereinafter more fully described and claimed and which are shown in the annexed drawings, in which—

Figure 1 is a top plan view of a baling press embodying the invention. Fig. 2 is a side elevation, showing the actuating mechanism for operating the twisting and the cutting mechanisms. Fig. 3 is a side elevation as seen from the side directly opposite that shown in Fig. 2. Fig. 4 is a front elevation of the wire cutting mechanism. Fig. 5 is a detail view of the wire twisting mechanism. Fig. 6 is a detail view showing the manner of carrying the wires to the radial slots in the twisting wheels. Fig. 7 is an enlarged sectional view through one of the twisting wheels and the front and rear plates between which the twisting mechanism is arranged on the line X—X of Fig. 5. Fig. 8 is a detail view of the trip mechanism for throwing the mechanism in and out of gear.

The bale box 2 is of usual construction and is adapted to occupy a horizontal position when in use and forms a support for the various mechanisms hereinafter referred to. The plunger 3 is provided at one end with a base extension 4 which is strengthened and braced by suitable stays 5. The plunger rod 6 is attached at its inner end to the base extension 4 and is designed to be actuated from any suitable source of power for compressing the bale within the bale box. A bar or portion 7 of the base extension 4 projects laterally through a slot 8 in the side of the bale box and has a rack bar 9 attached thereto and is provided with a stop 10. This rack bar 9 is adapted to mesh with a pinion G on the end of a transverse shaft N to transmit motion to the latter for operating the different mechanisms. This shaft N is journaled in suitable bearings and is provided with a crown gear wheel C which in addition to the crowned gear is provided with a segment gearing I on its periphery for the purpose of operating the arms which carry the binding wires to the twisting mechanism. This crown gear wheel C is keyed to the shaft N whereas the pinion G is movable on the said shaft to and from the gear wheel C and is held on the shaft N by feather and spline connections so as to revolve therewith.

A bar 11 parallel with the rack bar 9 is connected near its ends by links 12 with a portion of the bale box and is adapted to be moved laterally at the proper time to disengage the pinion G from the rack bar 9. A shaft 13 is journaled to the side of the bale box and is provided at its outer end with a curved arm 14 and at its inner end with a crank arm 15, which latter is connected with a spring 16 and with a lever 18 by means of the connecting rod 17. The free end of the lever 18 projects within the path of the stop 10 and is struck by the latter at the proper time to move the pinion G toward the gear wheel C and out of engagement with the rack bar 9. The curved arm 14 is adapted to engage with one of the links 12 to move the same so as to operate the bar 11 to bring the same in engagement with the pinion G.

The wire twisting mechanism consists of two twisting wheels A A and intermediate gearing 19 for connecting and causing the said twisting wheels to revolve in unison. The twisting wheels are mounted on tubular or hollow spindles X which are secured to a vertical plate 20 and have radial slots $a$ to receive the ends of the wires to be twisted. These radial slots $a$ are contracted at their inner ends to bring the wires in close relation so that on the rotation of the said twisting wheels the said wires will be twisted together.

The twisting wheels are depressed in their outer face and receive a plate Y which is secured in the recess. This plate is slotted to correspond with the slots $a$ in the twisting wheels and is of tempered steel to stand the strain of the wires without being worn. The outer end of the hollow or tubular spindle X is outwardly turned and is held between the body of the twisting wheel and the said plate Y. The spindle X has a slot in one side to register with the slot $a$ in the twisting wheel to receive the wires when the said slots are in register so that the twisting may be effected at or near the center of the twisting wheel and within the hollow spindle. One of the gear wheels 19 has its shaft $n$ extended and provided with a pinion N′ to mesh with the crown gear on the gear wheel C by means of which the twisting mechanism is set in motion.

The wire cutting mechanism consists of a steel plate 21 arranged parallel with the plate 20 and secured and supported by the latter, and having notches 22 in its lower edge opposite corresponding notches in the plate 20 to emit the wire passing freely to the radial slot in the twisting wheel A. Cutters 23 consisting of levers are pivoted between their ends to the plate 21 contiguous to the notches 22 so as to work across the said notches and sever the wire. These cutters or levers 23 are connected by a rod 24 which has its outer end provided with a hook 25 to be engaged by the crank 26 on the end of the rock shaft 27 which is arranged parallel with the shaft $n$ and is provided with an arm 28 to be struck by corresponding arm 29 on the shaft N. The edges of the cutters 22 are serrated or provided with series of teeth to engage with the wire and prevent the same slipping when the cutters are operated to sever the wires.

The binding wires 30 are carried on spools B B′ which are suitably journaled on opposite sides of the bale box. The wire from the spool B′ passes over suitable guides at the inner ends of slots through which the wire carrying arms $b'$ pass, and the wire from the spool B passes around grooved pulleys 31 which are secured to the ends of a shaft 32 and thence through suitable openings in the opposite sides of the bale box to that through which the wires from the spool B′ pass.

The distance around the grooved spools B makes the length of the bale. It is the intention to have different sized wheels or spools, to make different length bales, the circumference of the spool being the length of wire used in each bale, or on the one side that the wire runs straight and does not cross the press.

A rock shaft 33 is journaled parallel with the shaft 32 and is provided on opposite ends with arms 34 and 35, respectively. The arm 35 is adapted to strike the bar 11 and bring the same close to the support to which it is attached by means of the links 12. The arm 34 is adapted to be struck by stop or pin 36 on the side of one of the pulleys 31 so as to operate the rock shaft 33 and fold the bar 11 close to its support.

The arms $e$ $e$ for carrying the wire to the twisting wheels are curved in their length and arranged in parallel relation, the ends being tapering and grooved to prevent slipping of the wire and carry the same readily to the twisting mechanism. There will be a pair of these arms $e$ for each wire and the reason of providing them in pairs is to carry the wire into the slot in the twisting wheel and support the same during the process of twisting. These arms are attached to or form a part of a rod E which is curved or provided with an offset midway of its ends, and which is pivotally attached to the sides of the bale box. A plate E′ is secured between the outer ends of the bars E to brace and strengthen the same. A bar L is pivotally connected at one curved end to a plate E′ and has its other end pivotally connected with a crank on the outer end of a shaft $k$ which is journaled parallel with the shaft N and is provided on its inner end with a pinion J which is adapted to engage with a segment gearing I on the crown gear C by means of which at the proper time the arms $e$ $e$ will be actuated to carry the binding wires to the twisting mechanism.

It is the intention to have small grooved wheels in the ends of the arms $e$ $e$ over which the wires will run, instead of having to slip.

In the operation of the press after a bale has been formed the arms $e$ $e$ are actuated to carry the wires to the twisting mechanism, the latter being actuated to twist the ends of the wires together, after which the cutting mechanism is operated to sever the wires when the press is in the condition to produce another bale.

The mechanism constituting the attachment gets its power from the plunger by means of the rack bar 9 in the manner herein set forth. The attachment is inactive during the process of forming the bale, except the wire spools and the grooved pulleys which make a partial revolution with every feed put into the machine, the wires on the one side running straight along the side of the bale, and the wires on opposite side crossing back and forth to connect with the straight wire, at the twisting wheels, one revolution of the grooved pulleys 31 on the side of the straight wire being the length of the bale. When the grooved pulleys have completed one revolution the pin or crank 36 strikes the arm 34 and through rock shaft 33 and arm 35 transmits motion to the bar 11 and permits the pinion G to go in mesh with the rack bar on the backward stroke of the plunger. The rack bar 9 produces one revolution of the pinion G and operates the shaft N and through the mechanism hereinbefore set forth causes the arms $e$ to pass across the bale box and carry the wires to the twisting mechanism. After the wires are in proper position the gearing I meshes with the pinion N′ and sets the twisting mechanism in motion to twist the wires together. After the wires are twisted the arm 29 strikes the arm 28 on the shaft 27 and actuates the cutter mechanism to sever the wires as hereinbefore described.

Having thus described my invention, what I claim, and desire to secure by Letters Patent, is—

1. In a baling press the combination with a wire twisting mechanism of a pair of bars pivotally supported at one end to the side of the bale box and having pairs of arms projected from the free ends and constructed to be projected across the bale box and support the wires on each sides of a wire twisting mechanism, and a filling piece connecting the outer ends of the said bars to strengthen and brace the same and cause the arms to act together, substantially as described for the purpose set forth.

2. In a baling press, the combination with a wire twisting mechanism, of a wire cutting mechanism consisting of a tempered steel plate having notches in one edge, levers pivoted to the said plate between their ends and constituting cutters, and a bar connecting the said lever in series, substantially as described.

3. In a baling press the combination of a wire twisting mechanism comprising a tubular spindle having a slot on one side, a twisting wheel mounted on the said spindle and having a radial slot, a steel plate attached to the side of the twisting wheel and provided with a radial slot, the outer end of the tubular spindle being turned outwardly and held between the said twisting wheel and the said plate, substantially as set forth.

4. In a baling press, the combination with the bale box having a longitudinal slot in one side, a plunger having a portion constructed to work in the said slot, a rack bar attached to the said projecting portion, a wire twisting mechanism, a shaft N, gearing between the wire twisting mechanism and said shaft N, a pinion D on the shaft N and adapted to mesh with the said rack bar, and means for moving the said pinion on a shaft N to throw it out of engagement with the said rack bar, substantially as and for the purpose set forth.

5. In a baling press, the combination of a bale box having a longitudinal slot in one side, a plunger working in the said bale box and having a portion working in the said slot, a rack bar 9 attached to said projecting portion, a stop 10 connected with the plunger, a wire twisting mechanism, a wire cutting mechanism, arms to carry the binding wire to the wire twisting mechanism, a short shaft provided with a crank which is connected with and adapted to actuate the said arms for carrying the wires to the twisting mechanism, the shaft N for actuating the wire twisting and cutting mechanism, a pinion G mounted on the shaft N, a bar 11 connected by links to a portion of the bale box, a rock shaft 33 having arms 34 and 35, a shaft 13 having arms 14 and 15 a lever 18 connected with the arm 15 and adapted to be struck by the said stop 10, wire carrying spools, and grooved pulleys 31 which are actuated by the binding wires, one of the pulleys having a stop to engage with the arm 34 on the rock shaft 33, substantially as described for the purpose specified.

In testimony whereof I affix my signature in presence of two witnesses.

OLUS GATES.

Witnesses:
SAML. COLLINS,
M. L. ARCHER.